United States Patent [19]

Aoi et al.

[11] Patent Number: 4,777,553
[45] Date of Patent: Oct. 11, 1988

[54] MAGNETIC HEAD

[75] Inventors: Hajime Aoi, Tachikawa; Fumio Kugiya, Hachioji; Takashi Tamura, Kokubunji, all of Japan

[73] Assignee: Hitachi, Ltd., Tokyo, Japan

[21] Appl. No.: 919,424

[22] Filed: Oct. 16, 1986

[30] Foreign Application Priority Data

Oct. 16, 1985 [JP] Japan .............................. 60-228691

[51] Int. Cl.[4] ........................... G11B 5/12; G11B 5/22
[52] U.S. Cl. .................................... 360/114; 360/113; 360/122; 360/123
[58] Field of Search ...................... 360/114, 112–113, 360/120–125

[56] References Cited

U.S. PATENT DOCUMENTS

| | | | |
|---|---|---|---|
| 4,371,905 | 2/1983 | Valstyn et al. | 360/112 |
| 4,571,653 | 2/1986 | Suzuki et al. | 360/121 X |
| 4,609,961 | 9/1986 | Jacobs | 360/114 |
| 4,635,153 | 1/1987 | Shimamura et al. | 360/122 X |
| 4,639,810 | 1/1987 | Sakai | 360/122 X |
| 4,654,837 | 3/1987 | Browder | 360/114 X |
| 4,677,512 | 6/1987 | Akiyama et al. | 360/123 X |

Primary Examiner—John H. Wolff
Attorney, Agent, or Firm—Antonelli, Terry & Wands

[57] ABSTRACT

A magnetic head for reading-out information magnetically recorded on a magnetic recording medium in a waveform varying between two different phases. The magnetic head includes at least one block of high magnetic permeability disposed adjacent to and directly facing a surface of the magnetic recording medium to be read-out so as to provide a magnetic path for passing therethrough magnetic flux emanating from the magnetic record on the magnetic recording medium. A magnetic material member is disposed adjacent to the at least one block so as to cause the magnetic flux emanating from the magnetic record on the magnetic recording medium to pass therethrough and is responsive to transition of the magnetic flux corresponding to variation from one phase to another phase in the waveform representing the recorded information so as to provide a predetermined physical effect. Further, a detecting arrangement is provided for the detecting the predetermined physical effect.

11 Claims, 7 Drawing Sheets

MAGNETIC HEAD

BACKGROUND OF THE INVENTION

The present invention relates to a magnetic storage device, and in particular to a digital information storage device used in a digital recording apparatus such as a magnetic disc device and a magnetic tape device.

In a device of the prior art, information is read from/written into a vertical recording medium through a ring-type head as described in IEEE Transactions on Magnetics, Vol. MAG-21, No. 5, pp. 1365–1367 September 1985. In general, the medium is not provided with a high permeability film on several occasions.

In this case, a change in the magnetic flux passing through the magnetic core of the head is detected by a coil wound around a magnetic core. The leakage flux generated from magnetization transition recorded on the medium passes through the core along a window for winding. This unadvantageously results in an elongated magnetic circuit of the leakage flux and in increased magnetoresistance, the reproduction efficiency being lowered.

In a device of the prior art described in JP-A-59-40315, information is read from/written onto a vertical recording medium having double layers through a single sided single pole type head.

In this case, the main pole of the head is thin in thickness, resulting in low efficiency. Further, the nonuniformity in the height of the main pole directly exerts this advantageous influence upon the efficiency.

Further, such a known example of the prior art has drawbacks described below in addition to the above described lowering of the reproduction effciency caused by the long magnetic circuit of the leakage flux.

As shown in FIG. 3, magnetic characteristics (B-H characteristics) 29 of a vertical recording medium measured in a direction perpendicular to the medium surface are excellent in squareness. The magnitude of magnetization in the vicinity of the recorded transition which has important relation to the magnetic recording characteristics assumes a value 34 less than Br because of a demagnetization field 31 is generated from magnetization at the recording medium surface. In case of the double layered medium described in the aforementioned known example as well, the magnetization is decreased lower than Br by a demagnetization field 31 which is weakened by a high permeability layer. In case of a single layered medium, a demagnetization field 30 which is approximately twice in magnitude that of the double layered medium is generated since high permeability layer is not present. Thus the residual magnetization also assumes a smaller value 33. A smaller value of residual magnetization results in a smaller reproduced output. Therefore, the decrease in residual magnetization due to the demagnetization field poses a problem.

SUMMARY OF THE INVENTION

Therefore, an object of the present invention is to provide a magnetic storage device which is capable of reproducing with high efficiency an output pulse from magnetization transition recorded on the magnetic medium.

In order to achieve such an object, a head of a magnetic storage device in accordance with the present invention comprises high permeability blocks disposed in a path through which the magnetic flux emanating from the recording medium passes and comprises a magnetic material disposed in the vicinity of the high permeability blocks, and a change in flux passing through the magnetic substance is detected by using the magnetooptic effect, magnetoresistance effect or the like.

DESCRIPTION OF THE PREFERRED EMBODIMENTS

Figure 2:
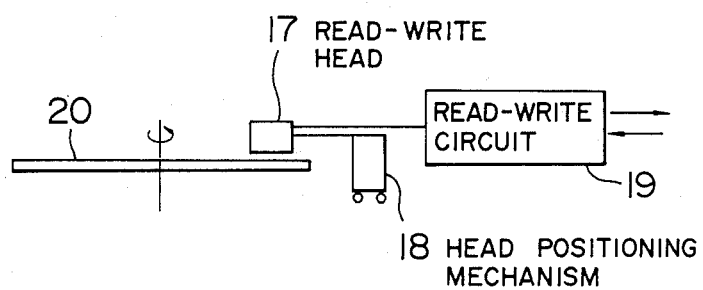
FIG. 2 is a configuration diagram of a magnetic storage device according to the present invention.

FIG. 2 shows the configuration of a device according to the present invention. The device is composed of a recording medium 20, a read-write head 17, a head positioning mechanism, and a circuit 19 including a read-write circuit.

Although FIG. 2 shows an example using a single head and a single surface recording medium, the present invention can be applied to cases using multiple heads and multiple both surface recording medium.

Figure 1:
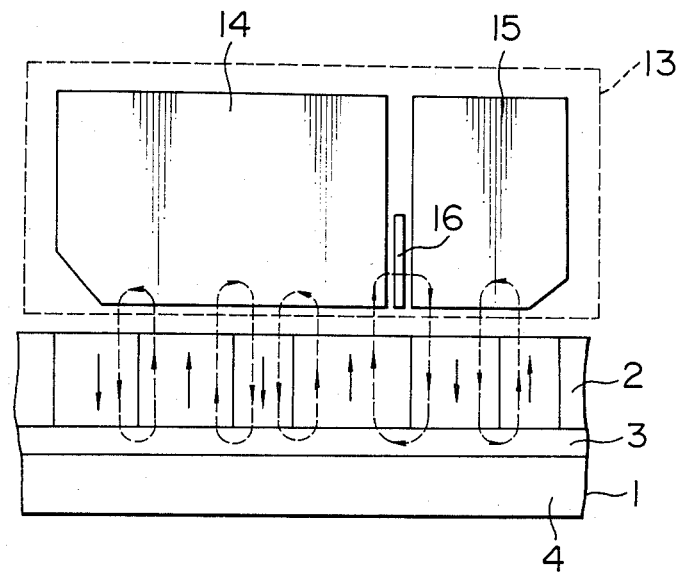
FIG. 1 is a concept diagram for illustrating the present invention.

FIG. 1 shows a read head 13 and a medium 1 constituting the nucleus of the present invention. The read head 13 is composed of two blocks 14 and 15 made of high permeability magnetic material and a magnetic material 16 for detection of recorded transition disposed between the two blocks. The direction of magnetic flux passing through the magnetic material 16 changes whenever the recorded transition is passed through, therefore the recorded transition is determined by detecting the magnetization reversal of the magnetic material 16 for detection of recorded transition by means of the magnetooptic effect or magnetoresistance effect.

Figure 3:
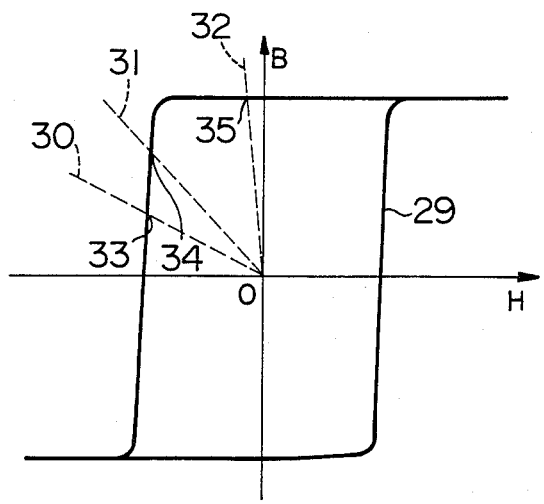
FIG. 3 is a magnetic characteristic diagram of a vertical recording medium.

The effect of a head according to the present invention is seen in the B-H characteristics of FIG. 3. In case of a head according to the present invention, the magnetic flux emanating from the recorded transition portion passes through a narrow gap between the head and the medium as well as a high permeability block. Accordingly, the demagnetization field is largely decreased as represented by the numeral 32. Thus the large signal can be reproduced from the large residual magnetization 35. The technique for detecting the magnetization reversal will now be described by referring to concrete examples. In the above described configuration, a combination of known heads is used as a write head. However, it is also possible to use the magnetic material 16 for detection of recorded transition shown in FIG. 1 as the write head by letting flow a current through it.

Figure 4:
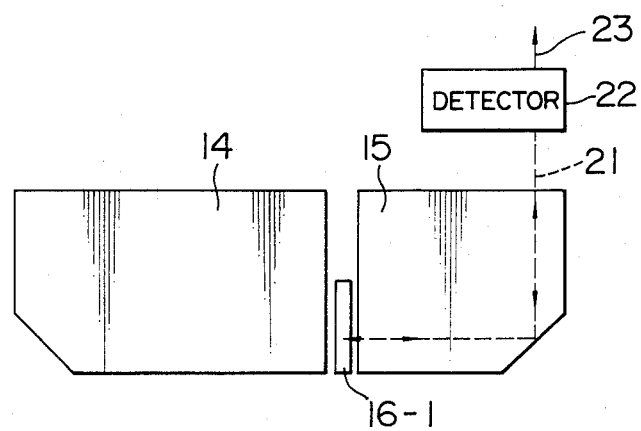
FIG. 4 shows a first embodiment of the present invention.

FIG. 4 shows a first embodiment using the Faraday effect. In this case, the high permeability magnetic material 15 is preferably transparent, and a material having a large Faraday constant such as garnet is used as a detector of recorded transition 16-1. After polarized light 21 has passed through the detector 16-1, it is reflected at the surface of the detector or at the surface of the high permeability magnetic material 14. The reflected light enters a detector 22 through the same path to be converted into an output 23 indicating the presence or absence of recorded transition.

Figure 5:
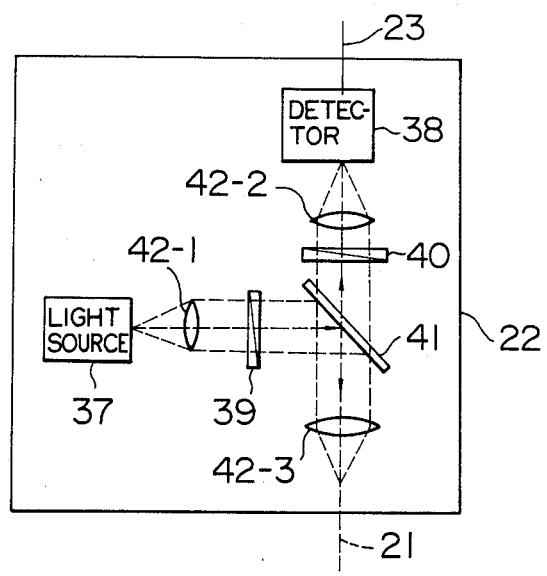
FIG. 5 shows an example of a detecotr according to the present invention.

An example of the detector 22 is shown in FIG. 5. A light source 37 is a semiconductor laser using GaAlAs, for example. A detector 38 is a Si-PIN diode. Other components constituting this optical system are a polarizer 39, an analyzer 40, a half mirror 41, and a lens group 42.

Figure 6:
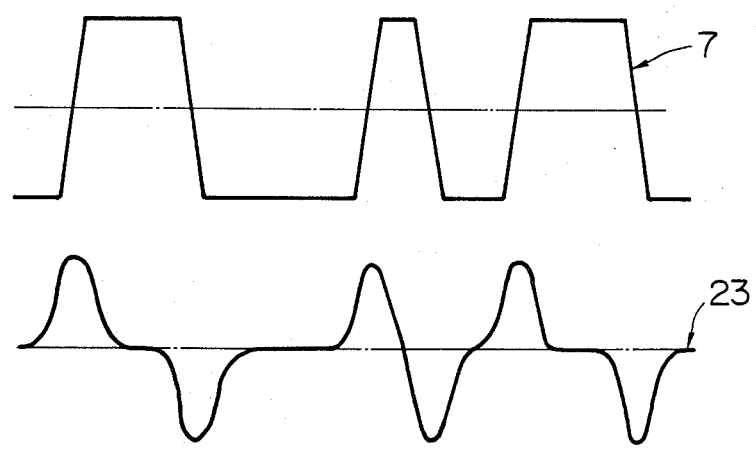
FIG. 6 shows a recording current and a readout waveform in the first embodiment of the present invention.

As shown in FIG. 6, the detector output 23 assumes a pulse waveform having polarities corresponding to the transition directions of a recording current 7. In FIG. 5, the light source and polarizer are represented by the same block 22 together with the detector for detecting the polarization plane of the reflected light coming from the detector of recorded transition 16-1.

In the first embodiment, the light 21 makes a return trip through the magnetic material 16-1 for detection of recorded transition. However, it is also possible to adopt configurationin which the light 21 passes through the high permeability magnetic material 14 after it has passed through the magnetic material 16-1.

Figure 7:
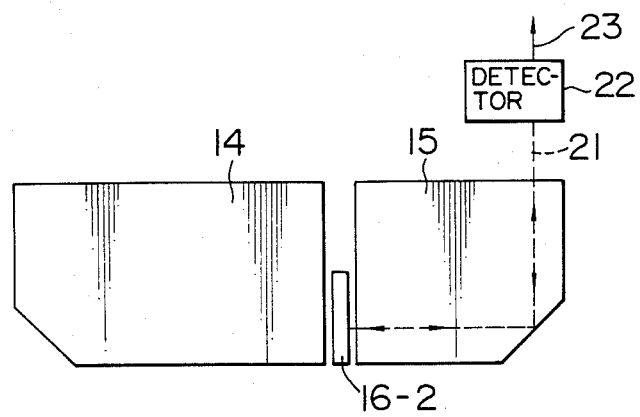
FIG. 7 to 13 show embodiments of the present invention.

FIG. 7 shows a second embodiment using the Kerr effect for detection. A magnetic material having a pronounced Kerr effect such as MnBi is used for a detector of recorded transition 16-2. In this case as well, the high permeability magnetic material 15 is desired to be transparent in the same way as the embodiment 1.

Figure 8:
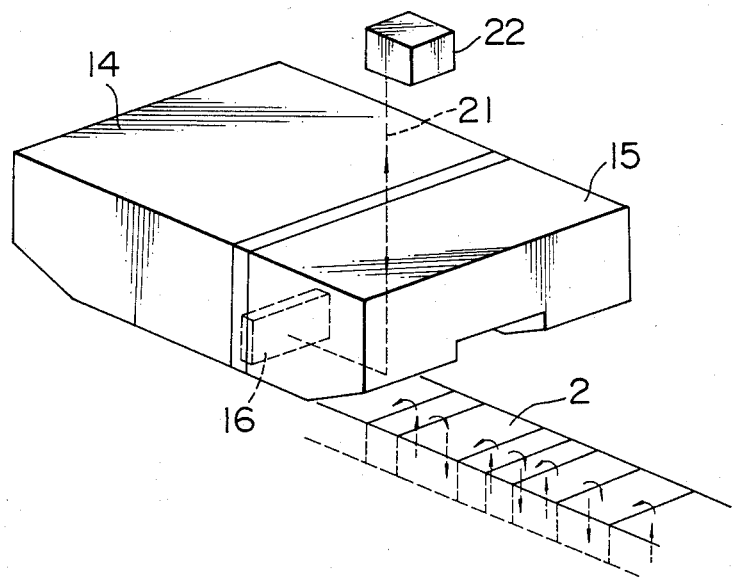

FIG. 8 shows an oblique view of the above described embodiments 1 and 2.

In the first and second embodiments, it is necessary to avoid the Faraday rotation of the polarized light 21 caused by passing through the high permeability material 15. It is thus necessary to choose a material having a very small Faraday constant as the high permeability magnetic material 15 or constitute the optical path of the light 21 by an optical fiber, for example.

Figure 9:
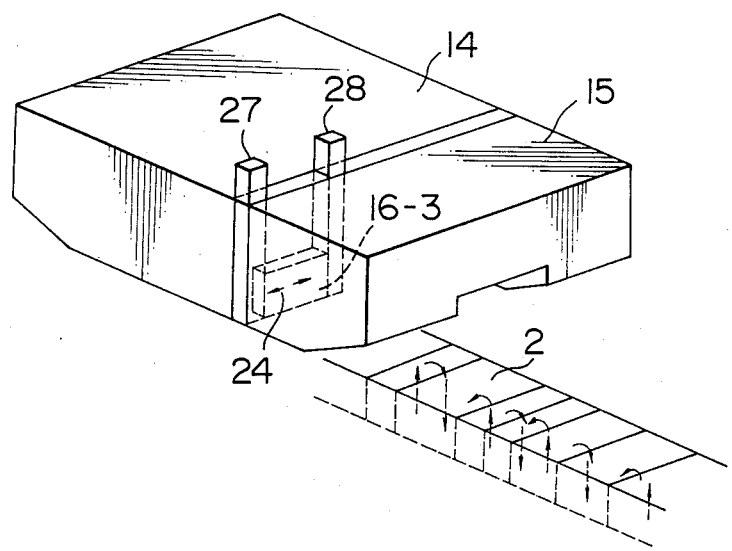
Figure 10:
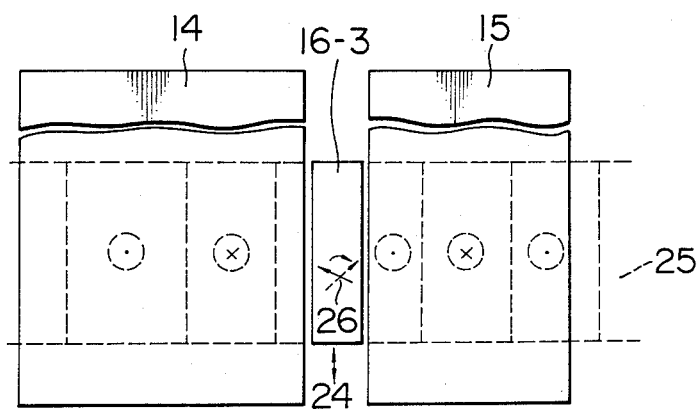

FIGS. 9 and 10 show a third embodiment in which the magnetoresistance effect is used for detection. FIG. 10 is a top view of the medium surface. The leakage flux emanating from the recorded track 25 crosses a detector with magnetoresistance effect 16-3. When the leakage field emanating from the medium is not present, the magnetization of the detector with magnetoresistance effect 16-3 is in a direction 24 within the detector surface which is parallel to that of the medium. When the leakage field emanating from the medium is present, however, the magnetization has a component 26 which is perpendicular to the face of the detector with magnetoresistance effect. Therefore, it becomes possible to detect the presence or absence of recorded transition as a change in the resistance value of the detector with magnetoresistance effect by letting flow a current between outgoing leads 27 and 28.

Figure 11:
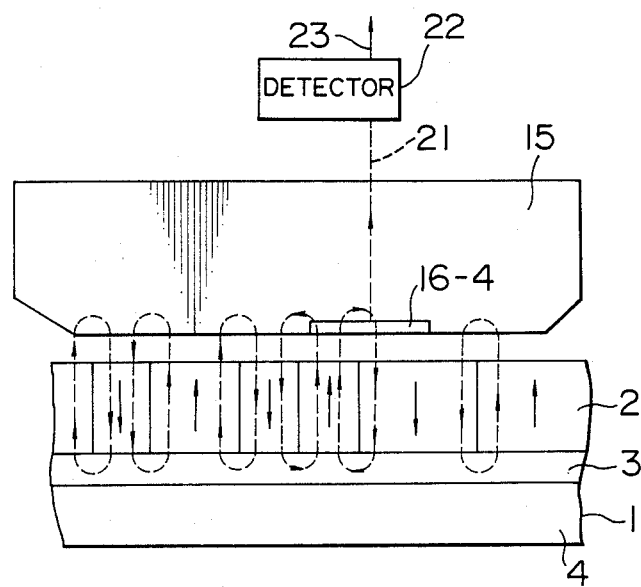

In the embodiments heretofore described, the detector for detecting the recorded transition on the magnetic medium is placed perpendicular to the medium. However, these detectors may be placed near the medium in parallel to the medium as shown in FIG. 11. In this case, the high permeability magnetic material 15 is placed adjacent to the detector with magnetoresistance effect 16-4 and at the side of the detector 16-4 remote from the medium 1.

Figure 12:
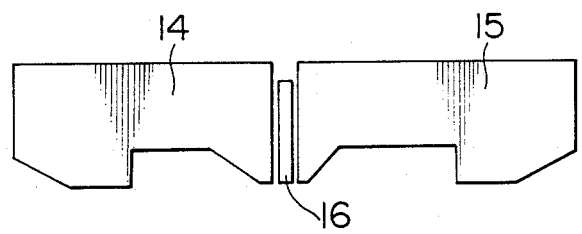

FIG. 12 shows an embodiment in which the high permeability magnetic material of the first, second and third embodiments has been deformed in order to improve the resolution of the reproduced signal.

In the embodiments heretofore described, a double layered vertical medium is used as shown in FIG. 1. However, it is evident that the present invention may be applied to a case where a single layered vertical recording medium is used and a case where a conventional longitudinal recording medium is used. Further, two high permeability magnetic materials are used in the above described embodiments. Even if only one high permeability magnetic material placed at either side (15, for example) is used, however, the practical use is possible although the efficiency is somewhat lowered.

Figure 13:
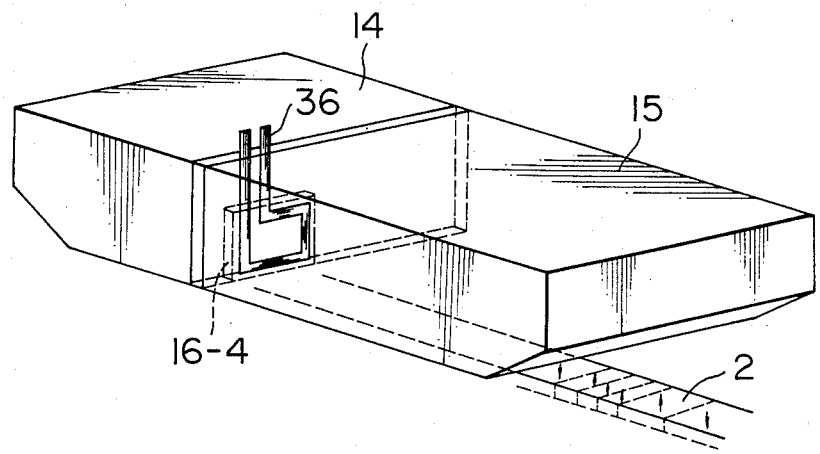
Figure 14:
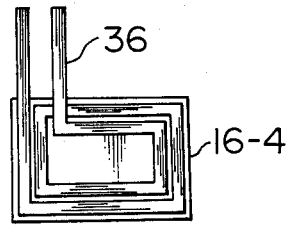
FIGS. 14 and 15 show structures of a coil for detecting induction according to the present invention.
Figure 15:
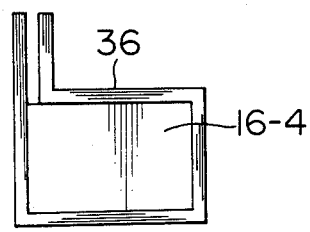

FIG. 13 shows a fourth embodiment in which the recorded transition on a high permeability layer 16-4 is detected by a coil. In this embodiment, the recorded transition on the high permeability layer 16-4 such as permalloy is detected by a coil 36 disposed between the high permeability magnetic materials 14 and 15. In this case, it is desirable that the coil 36 is disposed at least one side of the high permeability layer 16-4 and the coil has one turn or more as shown in FIG. 14. Although in this embodiment the coil is disposed between the high permeability layer and the high permeability magnetic material, the coil may be disposed along the outer periphery of the high permeability layer as shown in FIG. 15.

As heretofore described, the present invention makes possible efficient detection of the leakage flux caused by transition recorded on the magnetic recording medium.

We claim:

1. A magnetic head for reading out information magnetically recorded on a magnetic recording medium in a waveform varying between two different phases, said head comprising:
   two blocks of high magnetic permeability disposed adjacent to and directly facing a surface of said magnetic recording medium to be read-out so as to provide a magnetic path for passing therethrough magnetic flux emanating from the magnetic record on said magnetic recording medium, said blocks being separated by an air gap extending perpendicularly to the surface of said magnetic recording medium;
   magnetic means of magnetic material disposed in said air gap between said two blocks so as to cause the magnetic flux emanating from said magnetic record on said magnetic recording medium to pass therethrough, and responsive to transistion of the magnetic flux corresponding to variation from one to the other phase in the waveform representing the recorded information to provide a predetermined physical effect, and
   means for detecting the predetermined physical effect provided by said magnetic means.

2. A magnetic head according to claim 1, wherein said air gap separating said two blocks is a substantially uniform air gap, said magnetic means being disposed only within said air gap.

3. A magnetic head according to claim 1, wherein said magnetic means provides a magneto-optic effect in response to the transition of the magnetic flux.

4. A magnetic head according to claim 3, wherein said physical effect detecting means comprises a light system for projecting a polarized light onto said magnetic means and for receiving said polarized light after passing through said magnetic means, and a detector for detecting polarization of said polarized light received by said light system.

5. A magnetic head according to claim 4, wherein at least one of said blocks is made of transparent material.

6. A magnetic head according to claim 1, wherein said magnetic means provides a magnetoresistance effect in response to the transition of the magnetic flux.

7. A magnetic head according to claim 6, wherein said physical effect detecting means includes means for supplying an electric current to said magnetic means for detecting the magnetoresistance effect provided by said magnetic means.

8. A magnetic head according to claim 1, wherein said magnetic means comprises a layer made of material of high magnetic permeability and a coil provided adjacent to said layer.

9. A magnetic head for reading out information magnetically recorded on a magnetic recording medium in a waveform varying between two different phases, said head comprising:

a block of high magnetic permeability disposed adjacent to and directly facing a surface of said magnetic recording medium to be read-out so as to provide a magnetic path for passing therethrough magnetic flux emanating from the magnetic record on said magnetic recording medium;

magnetic means disposed adjacent to said block and extending parallel to the surface of said magnetic recording medium so as to cause the magnetic flux emanating from said magnetic record on said magnetic recording medium to pass therethrough, and responsive to transition of the magnetic flux corresponding to variation from one to the other phase in the waveform representing the recorded information to provide a predetermined physical effect; and means for detecting the predetermined physical effect provided by said magnetic means.

10. A magnetic head according to claim 9, wherein said magnetic means provides magneto-optic effect in response to the transition of the magnetic flux.

11. A magnetic head according to claim 10, wherein said block is made of transparent material.

* * * * *